United States Patent [19]
Duryea

[11] Patent Number: 5,335,943
[45] Date of Patent: Aug. 9, 1994

[54] AUTOMOBILE ENGINE HOSE SYSTEM WITH PLURALITY OF ADAPTOR MEMBERS

[76] Inventor: Duane Duryea, 37 E. Loines Ave., Merrick, N.Y. 11566

[21] Appl. No.: 49,548

[22] Filed: Apr. 20, 1993

[51] Int. Cl.⁵ .......................................... F16L 33/00
[52] U.S. Cl. ..................... 285/12; 285/915; 285/239; 285/177
[58] Field of Search ............... 285/12, 177, 915, 238, 285/239, 242

[56] References Cited

U.S. PATENT DOCUMENTS

| | | |
|---|---|---|
| 3,109,461 | 11/1963 | Wolff et al. |
| 3,114,969 | 12/1963 | Roth |
| 3,242,691 | 3/1966 | Robinson et al. |
| 3,524,661 | 8/1970 | Farnam |
| 3,613,736 | 10/1971 | Kuwabara |
| 4,035,002 | 7/1977 | Curtin ................ 285/915 |
| 4,172,473 | 10/1979 | Lefere et al. |
| 4,236,736 | 12/1980 | Anderson |
| 4,257,629 | 3/1981 | Maple et al. ............ 285/12 |
| 4,266,813 | 5/1981 | Oliver .................... 285/12 |
| 4,420,176 | 12/1983 | Cornwall ............... 285/915 |
| 4,480,860 | 11/1984 | Foresta et al. |
| 4,484,769 | 11/1984 | Laley ..................... 285/239 |
| 4,498,691 | 2/1985 | Cooke .................... 285/12 |
| 4,589,688 | 5/1986 | Johnson ................. 285/12 |
| 4,592,749 | 6/1986 | Ebling et al. .......... 285/239 |
| 4,607,868 | 8/1986 | Harvey et al. ......... 285/12 |
| 4,786,086 | 11/1988 | Guthrie et al. |
| 4,793,636 | 12/1988 | Keck ...................... 285/12 |
| 4,813,716 | 3/1989 | Lalikos et al, ......... 285/915 |
| 4,819,969 | 4/1989 | Williams |
| 4,870,995 | 10/1989 | Igarashi et al. |
| 4,923,224 | 5/1990 | Makris |
| 4,991,876 | 2/1991 | Mulvey |
| 5,020,577 | 6/1991 | McMillan |
| 5,028,078 | 7/1991 | Schwarz et al. ...... 285/12 |
| 5,060,689 | 10/1991 | Csaszar et al. ....... 285/12 |
| 5,082,315 | 1/1992 | Sauer ..................... 285/12 |
| 5,165,727 | 11/1992 | Valley .................... 285/12 |
| 5,165,728 | 11/1992 | Mayer .................... 285/12 |

FOREIGN PATENT DOCUMENTS 2917803  11/1980  Fed. Rep. of Germany ........ 285/12

*Primary Examiner*—Eric K. Nicholson
*Attorney, Agent, or Firm*—Gottlieb, Rackman & Reisman

[57] ABSTRACT

An automobile engine hose replacement system for providing a customized hose that is connectable between two couplings or nozzles in any automobile engine is provided. The hose replacement system includes a length of hose and a plurality of various size adaptor members. The length of hose is suitable for being cut to any desired length for providing a hose member having first and second ends. Each of the adaptor members is suitable for coupling to either end of the cut hose member in order to selectively adjust the hose diameter at either end. As a result, the hose member may be selectively connected to any pair of nozzles, whether they be of the same size or of differing sizes.

16 Claims, 3 Drawing Sheets

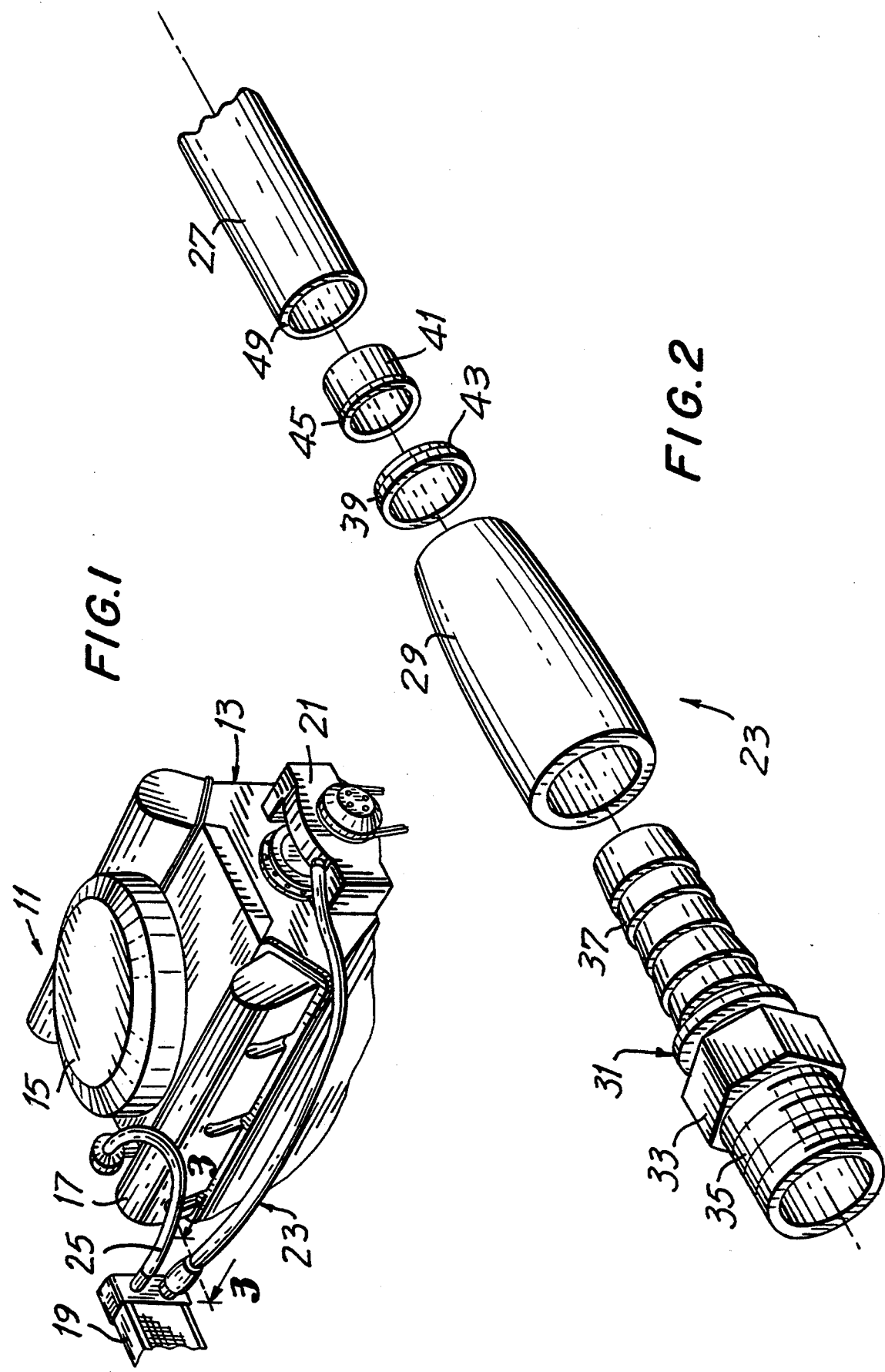

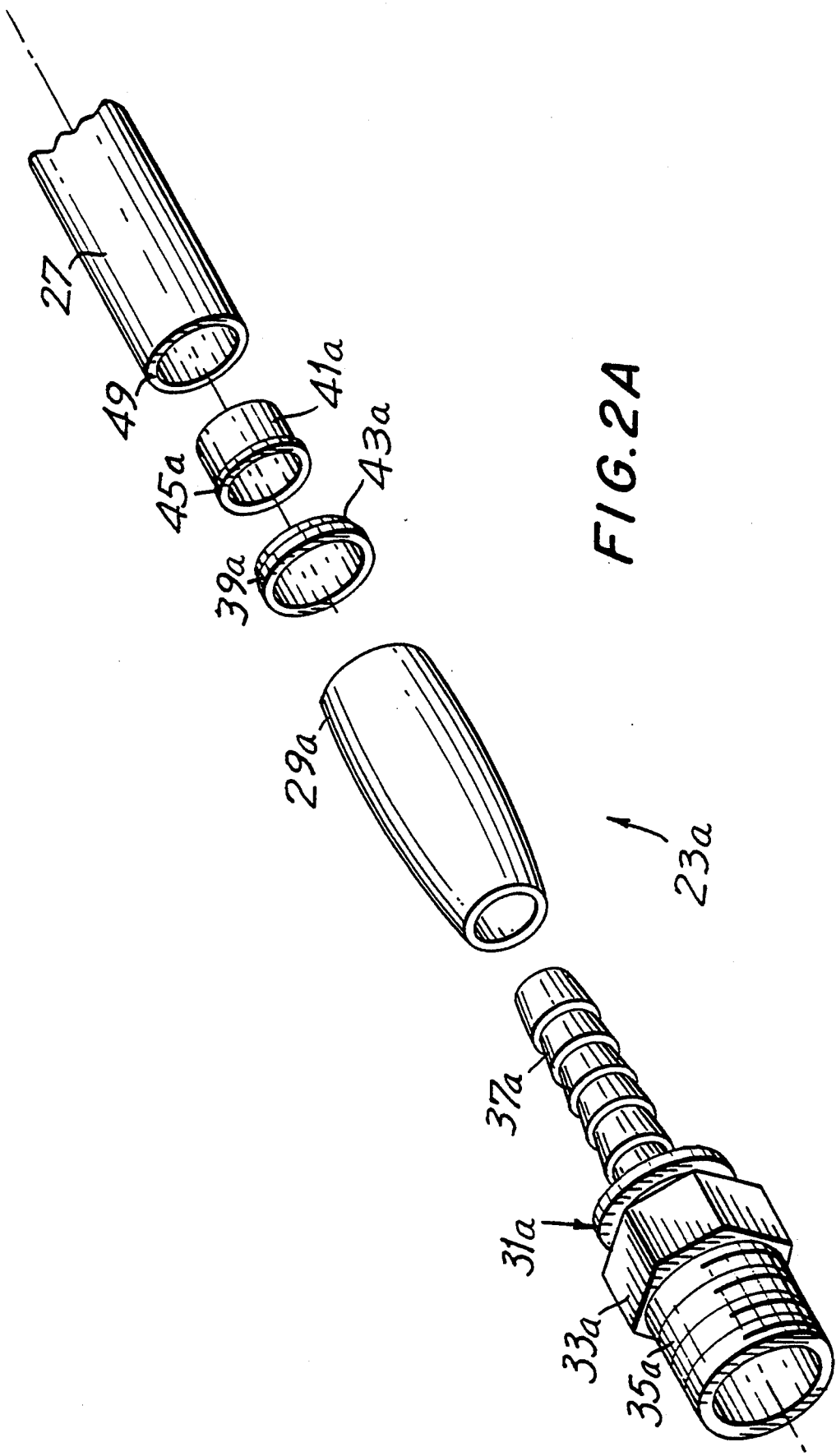

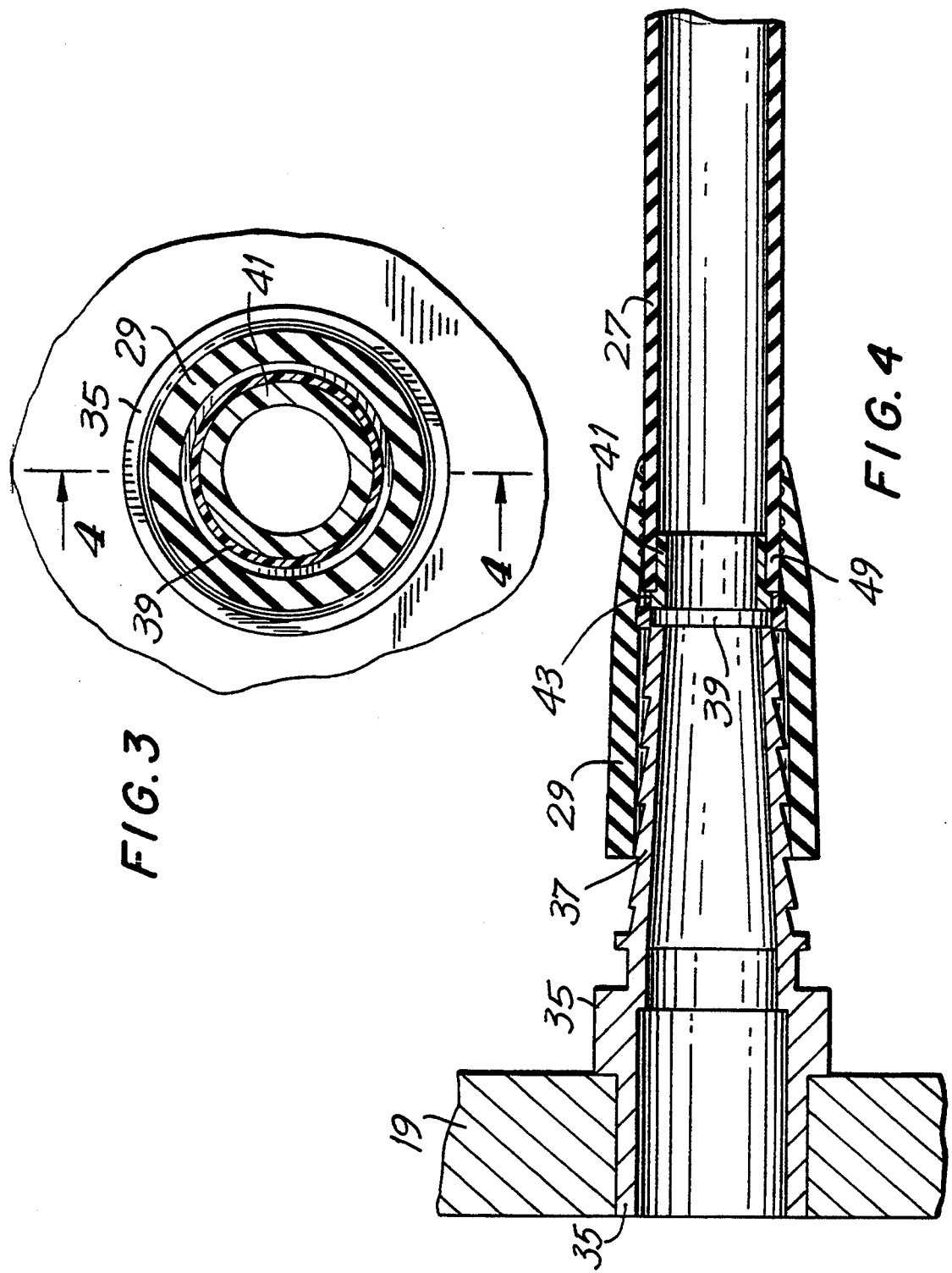

AUTOMOBILE ENGINE HOSE SYSTEM WITH PLURALITY OF ADAPTOR MEMBERS

BACKGROUND OF THE INVENTION

This invention relates to a method or system for replacing an engine hose in an automobile, and more particularly to an automobile engine hose replacement system for providing a customized hose which is selectively connectable between first and second nozzle members in most automobile engine.

In all automobile engines, there are a number of hoses for carrying water and other fluids between various parts in the engine. By way of example, all automobile engines include one or more heater hoses for circulating water or some other type of coolant through various engine components in order to prevent engine overheating. Typically, there is a hose which runs from the engine radiator (which retains a water/coolant combination) to the engine as well as a return hose running from the engine back to the radiator for maintaining circulation of the water/coolant fluid.

Most hoses used in or in conjunction with an automobile engine have a first narrow end and a second wider end. This is because the two coupling members or nozzle members to which the ends of the hose are connected are of differing size. Therefore, if a car hose is damaged or tears, in order to replace the hose, a specialized replacement hose part which has the required hose dimensions at either end thereof must be ordered from specialized manufacturers.

Accordingly, it would be desirable to provide an automobile engine hose replacement system which enables an automobile repair garage to quickly and economically replace an engine hose whenever such replacement becomes necessary.

SUMMARY OF THE INVENTION

Generally speaking, in accordance with the invention, an automobile engine hose replacement system for providing a customized hose that is connectable between two couplings or nozzles in any automobile engine is provided. The hose replacement system includes a length of hose and a plurality of various size adaptor members. The length of hose is suitable for being cut to any desired length for providing a hose member having first and second ends. Each of the adaptor members is suitable for coupling to either end of the cut hose member in order to selectively adjust the hose diameter at either end. As a result, the hose member may be selectively connected to any pair of nozzles, whether they be of the same size or of differing sizes.

In order to utilize the system, a length of hose is typically stored in a garage or repair shop (possibly on a spool), which may be cut to any desired length, as is needed for hose replacement. In addition, a garage repair shop also stores the plurality of various sized adaptor members. During hose replacement, one or more of these adaptor members are selected based on the size of the couplings or nozzles in the engine between which the replacement hose will extend.

Initially, the one or more selected adaptors is coupled or attached to the end of the cut hose member by conventional methods such as gluing or heat sealing. After the adaptor member is connected to the hose member end, that end is then connected to the desired engine nozzle; the other end of the hose member (which may or may not be modified by a second adaptor) is connected to the other engine nozzle.

The engine hose replacement system of the invention provides a significant cost savings to both the garage repair facility and the consumer since it avoids purchasing specially designed engine hoses from manufacturers or dealers. Moreover, hose repair is achieved in a far more expeditious fashion since specially designed hose components will not have to be ordered.

Accordingly, it is an object of the invention to provide a novel automobile engine hose replacement system.

Still another object of the invention is to provide an automobile engine hose replacement system for providing customized replacement of any automobile engine hose.

A further object of the invention is to provide an automobile engine hose replacement system which is significantly less expensive than conventional systems.

Yet another object of the invention is to provide an automobile engine hose replacement system which may be carried out by a garage repair facility without any delay.

Still a further object of the invention is to provide an automobile engine hose replacement system which avoids the ordering of specialized parts from local or regional dealers and manufacturers.

Still another object of the invention is to provide an automobile engine hose replacement system which may be used for any size or manufactured automobile engine.

Still other objects an advantages of the invention will in part be obvious and will in part be apparent from the following description.

The invention accordingly comprises the several steps and the relation of one or more of such steps with respect to each of the others, and the system embodying the features of construction, combination of elements and arrangement of parts which are adapted to affect such steps, all as exemplified in the detailed disclosure hereinafter set forth, and the scope of the invention will be indicated in the claims.

BRIEF DESCRIPTION OF DRAWINGS

For a fuller understanding of the invention, reference is made to the following description taken in connection with the accompanying drawings, in which:

FIG. 1 is a perspective view of an automobile engine assembly of a conventional type showing several hose connections;

FIG. 2 is an exploded perspective view of the engine hose assembly of the invention showing the various component parts;

FIG. 2A is an exploded perspective view of an alternative engine hose assembly showing an adaptor decreasing the interior diameter of the hose;

FIG. 3 is a cross-sectional view taken along line 3—3 of FIG. 1; and

FIG. 4 is a cross-sectional view taken along line 4—4 of FIG. 3.

DETAILED DESCRIPTION OF PREFERRED EMBODIMENT

Referring first to FIG. 1, an automobile engine hose assembly generally indicated at 11 as is well known in the art is shown. Engine assembly 11 includes an engine block 13 upon which a carburetor/air filter assembly 15 is mounted. Of course engine assembly 11 can be equipped with a fuel injection system (not shown), instead of carburetor/air filter assembly 15. Assembly 11 further includes a housing 17 in which the engine cylinders are retained as well as a belt assembly 21 for turning the water pump.

Disposed adjacent to engine assembly 11 is a radiator 19, as is well known in the art, from which a pair of hose assemblies 23 and 25 extend. Hose assembly 23 runs from radiator 19 to belt assembly 21 and hose assembly 25 runs from the end of engine block 13 back to radiator 19. Hose assemblies 23 and 25 enable water and/or other coolant fluids to be circulated through engine assembly 11 in order to prevent engine overheating.

Turning now to FIGS. 2–4, hose assembly 23 is now further described. Hose assembly 23 includes a hose 27, an adaptor 29 coupled to the end of hose 27 for enlarging the end opening and a nozzle assembly generally indicated at 31 mounted in radiator 19 for receiving adaptor 29. Nozzle assembly 31 includes a threaded male portion 35, a turning nut 33 and a nozzle 37. Threaded male portion 35 is adapted for being threaded into a corresponding female threaded portion of radiator 19 (not shown) by turn nut 33 as is well known in the art. Nozzle 37 receives adaptor 29, as best shown in FIG. 4, by a force fit arrangement.

With particular reference to FIG. 2A, hose assembly 23a depicts a second hose assembly for adapting hose 27 to a different size nozzle. Hose assembly 23a includes a hose 27, an adaptor 29a coupled to the end of hose 27 for decreasing the interior diameter of the end opening and a nozzle assembly generally indicated at 31a for example mounted in radiator 19. Nozzle 31a is adapted for receiving an adaptor 29a. Nozzle assembly 31a includes a threaded male portion 35a, a turning nut 33a and a nozzle 37a. Threaded male portion 35a is adapted for being threaded into a corresponding female threaded portion of radiator 19a (not shown) by turning nut 33a as is well known in the art. Nozzle 37a receives adaptor 29a as shown in FIG. 4, by a force-fit arrangement.

In order to connect the end of hose 27 to adaptor 29, as shown in FIG. 4, a plastic form 41 is inserted into the end of hose 27 for maintaining the shape thereof. Plastic form 41 includes an annular lip 45 which abuts annular edge 49 of hose 27 and prevents form 41 from sliding into the interior of hose 27.

Hose assembly 23 further includes a gasket 39 (see FIG. 2) for maintaining a fluid tight seal between hose 27 and adaptor 29 mounted thereover, as described hereinafter. Gasket 39 has an annular configuration and includes an inner ledge 43 which sits over lip 45 of plastic form 41. Gasket 43 is maintained in position over form 43 and abuts edge 49 of hose 27 when adaptor 29 is press-fit over the end of hose 27, as best shown in FIG. 4.

In order for an automobile garage repair facility to replace an automobile engine hose in accordance with the invention, the facility retains or stores an extended length of hose as well as various sized adaptor members, such as adaptor member 29. Several different width hoses may be retained in stock by the garage facility, such as half inch, five-eighth inch and three-quarter inch widths. Alternatively, a plurality of hose members of different lengths could be maintained in stock. The various adaptor members would typically be purchased from a specified manufacturer and would include various sized adaptors which both enlarge and reduce the diameter of a hose end.

Once a garage repair facility decides that an engine hose needs to be replaced, the facility first cuts a length of hose which is necessary for replacement purposes (or chooses a hose member of a desired length). Then, the facility must select a suitable adaptor member for enlarging or reducing in size the end of the cut hose so that it may be connected to the desired nozzle. As shown in the drawings, adaptor 29 has been selected to enlarge the end of hose 27 in order to connect hose 27 to nozzle assembly 31.

Once a suitable adaptor member is selected, it must be connected or coupled to the end of the hose member. This is achieved by first utilizing a form and gasket of the type shown in the drawings, as described above. Then, the appropriate end of the adaptor member is mountingly fitted over the end of the hose, as, for example, shown in FIG. 4 of the drawings. Because of form 41, the end of hose 27 is maintained in an open condition despite the inward force exerted thereon by mounted adaptor 29. Also, because of the disposition of gasket 39, a fluid tight seal is maintained between adaptor 29 and hose 27.

Preferably, and referring once again to the drawings, in order to ensure that adaptor 29 is retained in a mounted configuration over the end of hose 27, adaptor 29 may be applied with a glue or other adhesive. The adhesive may be brushed on the inside of adaptor 29 or adaptor 29 may instead be dipped in a glue material. Alternatively, a fast drying contact cement could be used.

Once adaptor 29 is connected to the end of hose 27, it is then necessary to connect adaptor 29 to nozzle assembly 31. This is achieved, as shown in FIGS. 2 and 4, by force fitting adaptor 29 over nozzle 37 until a tight fit is achieved. Preferably, adaptor 29 is then clamped over nozzle 37 of nozzle assembly 31 utilizing a conventional clamping member, as is well known in the art (not shown).

After one end of hose 27 is connected to hose assembly 31 by means of adaptor 29, it is necessary to connect the other end of hose 27 to the appropriate nozzle or coupling in the engine assembly. In some situations, it will not be necessary to modify the size or diameter of this end of hose 27 in order to achieve a satisfactory connection. In other situations, however, it will be necessary to utilize a second adaptor for either enlarging or reducing in size the other hose end so that a suitable connection may be achieved.

In accordance with the invention, it is understood that the garage repair facility will carry in stock and/or store a plurality of differing adaptors so that the ends of a hose to be used for repair or replacement may be modified in size to virtually any configuration. By way of example, the various sized adaptors may be purchased as a kit from a specially designated manufacturer. When certain size adaptors are used up, additional replacement adaptors may be ordered from the manufacturer by the garage repair facility.

Preferably, the adaptors will be made of a rubber or silicon material, the latter providing enhanced stretchability.

Although the invention has been described in connection with an automobile engine assembly, the engine hose replacement system of the invention is suitable for any vehicular engine.

It will thus be seen that the objects set forth above, among those apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. An automobile engine hose replacement system for providing a customized hose member which is selectively connectible to one of a plurality of nozzles found in an automobile engine comprising:

a length of flexible hose having a substantially uniform inside diameter and adapted for being sized to any desired length for providing a hose member having first and second ends of substantially the same size inside diameter; and a plurality of various sized flexible tapered adaptor members, each of said adaptor members comprising a first adaptor end with a first sized inside diameter for coupling to either end of said hose member in order to selectively adjust hose inside diameter at said end, and a second adaptor end with a different sized inside diameter for selective connection to one of said plurality of nozzles found in said automobile engine.

2. The system of claim 1, wherein at least some of said plurality of adaptor members are suitable for enlarging hose inner diameter at said end of said hose member.

3. The system of claim 1, wherein at least some of said plurality of adaptor members are suitable for reducing hose inner diameter at said end of said hose member.

4. The system of claim 1, wherein each of said adaptor members is adapted for coupling to either end of said hose member by mounting said adaptor member over said hose member end.

5. The system of claim 4, further comprising a plurality of form members, each of said form members adapted for maintaining the end of said hose member in an open condition when said adaptor member is mounted over said hose member end.

6. The system of claim 5, wherein each of said form members is adapted for disposition within said hose member end.

7. The system of claim 4, further comprising a plurality of gaskets, each of said gaskets adapted for reception by said adaptor member when said adaptor member is mounted over said hose member end for maintaining a substantially fluid tight seal between said adaptor member and said hose member.

8. A customized method for replacing a hose member which is selectively connectible to one of a plurality of nozzles having various sized outer diameters and found in an automobile engine comprising:

selecting a flexible hose member of a desired length having first and second ends of substantially the same size inside diameter;

storing a plurality of various sized flexible tapered adaptor members, each of said adaptor members comprising a first adaptor end with a first sized inside diameter and a second adaptor end with a different sized inside diameter;

selecting one of said plurality of adaptor members based on the outer diameter of said nozzle to which said hose member is to be connected;

coupling said first end of said selected adaptor member to one of said hose member ends in order to adjust the hose member inside diameter at said hose member end; and connecting said second end of said selected adaptor member to said nozzle to which said hose member is to be connected.

9. The method of claim 8, wherein said selecting step comprises:

storing a length of hose having a substantially uniform inner diameter; and sizing said length of hose to said desired length in order to produce said hose member.

10. The method of claim 8, further including the step of selecting a second of said plurality of adaptor members based on the size of the other of said first or second nozzles; and wherein said second connecting step comprises connecting the other of said hose member ends to the other of said nozzles by means of said second selected adaptor member.

11. The method of claim 8, wherein said sizing step comprises cutting said length of hose to said desired length.

12. The method of claim 8, wherein said coupling step comprises mountingly fitting said adaptor member over said one of said hose member ends.

13. The method of claim 12, further including disposing a form member inside said one of said hose member ends prior to said coupling step in order to maintain said one of said hose member ends in an open condition.

14. An automobile engine hose replacement system for providing a customized hose member which is selectively connectible to one of a plurality of nozzles having various sized outer diameters and found in an automobile engine comprising:

a hose member of a desired length having first and second ends of substantially the same size inside diameter;

a plurality of various sized flexible tapered adaptor members, each of said adaptor members comprising a first adaptor end with a first sized inside diameter for coupling to either end of said hose member in order to selectively adjust hose inside diameter at said end, and a second adaptor end with a different sized inside diameter for selectively connecting to one of said plurality of nozzles found in said automobile engine.

15. The system of claim 14, wherein said first nozzle has a different size than said second nozzle.

16. The system of claim 14, wherein each of said adaptor members is adapted for coupling to either end of said hose member by mounting said adaptor member over said hose member end.

* * * * *